United States Patent [19]

Inman et al.

[11] Patent Number: 5,398,487
[45] Date of Patent: Mar. 21, 1995

[54] BALE BAGGING MACHINE

[75] Inventors: Larry R. Inman; Michael H. Koskela, both of Astoria, Oreg.

[73] Assignee: Ag-Bag Corporation, Warrenton, Oreg.

[21] Appl. No.: 157,404

[22] Filed: Nov. 26, 1993

[51] Int. Cl.⁶ .......................... B65B 9/10; B65B 43/42
[52] U.S. Cl. ........................................ 53/567; 53/575; 53/576
[58] Field of Search ............... 53/527, 529, 530, 556, 53/567, 575, 576, 585

[56] References Cited

U.S. PATENT DOCUMENTS

| | | | |
|---|---|---|---|
| 3,264,796 | 8/1966 | Tomczak et al. | 53/585 |
| 3,548,567 | 12/1970 | Manetta | 53/530 |
| 3,714,756 | 2/1973 | MacInnes et al. | 53/585 |
| 3,816,968 | 6/1974 | Morgan et al. | 53/585 |
| 3,839,125 | 10/1974 | Horvath | 53/585 |
| 3,935,691 | 2/1976 | Broch | 53/59 R |
| 3,961,459 | 6/1976 | Wolske | 53/556 |
| 4,165,595 | 8/1979 | Pilley et al. | 53/556 |
| 4,188,249 | 2/1980 | Fujio | 53/585 |
| 4,199,917 | 4/1980 | Mitchell | 53/556 |
| 4,354,333 | 10/1982 | McArdle | 53/585 |
| 4,412,876 | 11/1983 | Lerner et al. | 53/585 |
| 4,590,748 | 5/1986 | Harrison et al. | 53/576 |
| 4,653,553 | 3/1987 | Cox et al. | 141/114 |
| 4,672,794 | 6/1987 | Good | 53/576 |
| 4,686,817 | 8/1987 | Brodrecht et al. | 53/567 |
| 4,771,510 | 9/1988 | Kawai | 53/567 |
| 4,888,937 | 12/1989 | Glenn | 53/567 |
| 4,938,006 | 7/1990 | Korsgaard | 53/576 |
| 4,945,715 | 8/1990 | Brodrecht | 53/567 |
| 5,220,772 | 6/1993 | Koskela et al. | 53/576 |

FOREIGN PATENT DOCUMENTS

WO91/07867  6/1991  WIPO ............... 53/567

*Primary Examiner*—John Sipos
*Assistant Examiner*—Rodney A. Butler
*Attorney, Agent, or Firm*—Robert L. Harrington

[57] ABSTRACT

A machine for sheathing bales of material, such as farm crop products, into an elongate elastic bag. The machine is a portable unit and has radially adjustable fin like paddles that define a bale receiving opening. An opened ended bag into which the bales are to be sheathed is placed in a folded or bunched up condition on the paddles. A portion of the bag is pulled off the paddles and tied to define a closed end and the paddles are moved radially outward to enlarge the bale receiving opening and thereby stretch the bag. The machine has a platform for receiving bales to be sheathed, and a bale pusher pushes the bale off the platform through the bale receiving opening into the bag. The bales as they exit the machine and are deposited on the ground are encased in the bag. The bag being elastic conforms closely to the shape of the bale. The pusher is extendable to facilitate pushing the last bale through the machine.

11 Claims, 4 Drawing Sheets

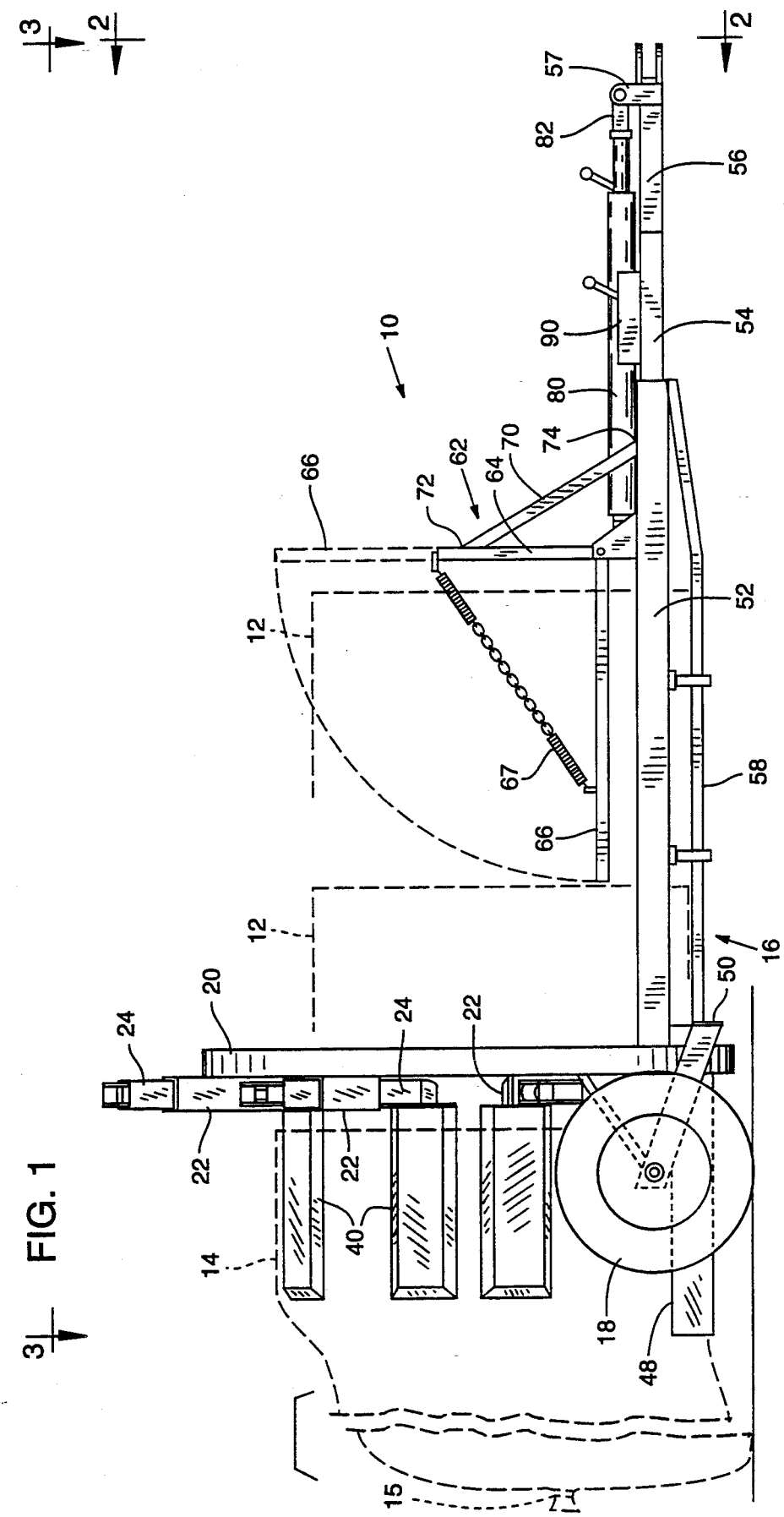

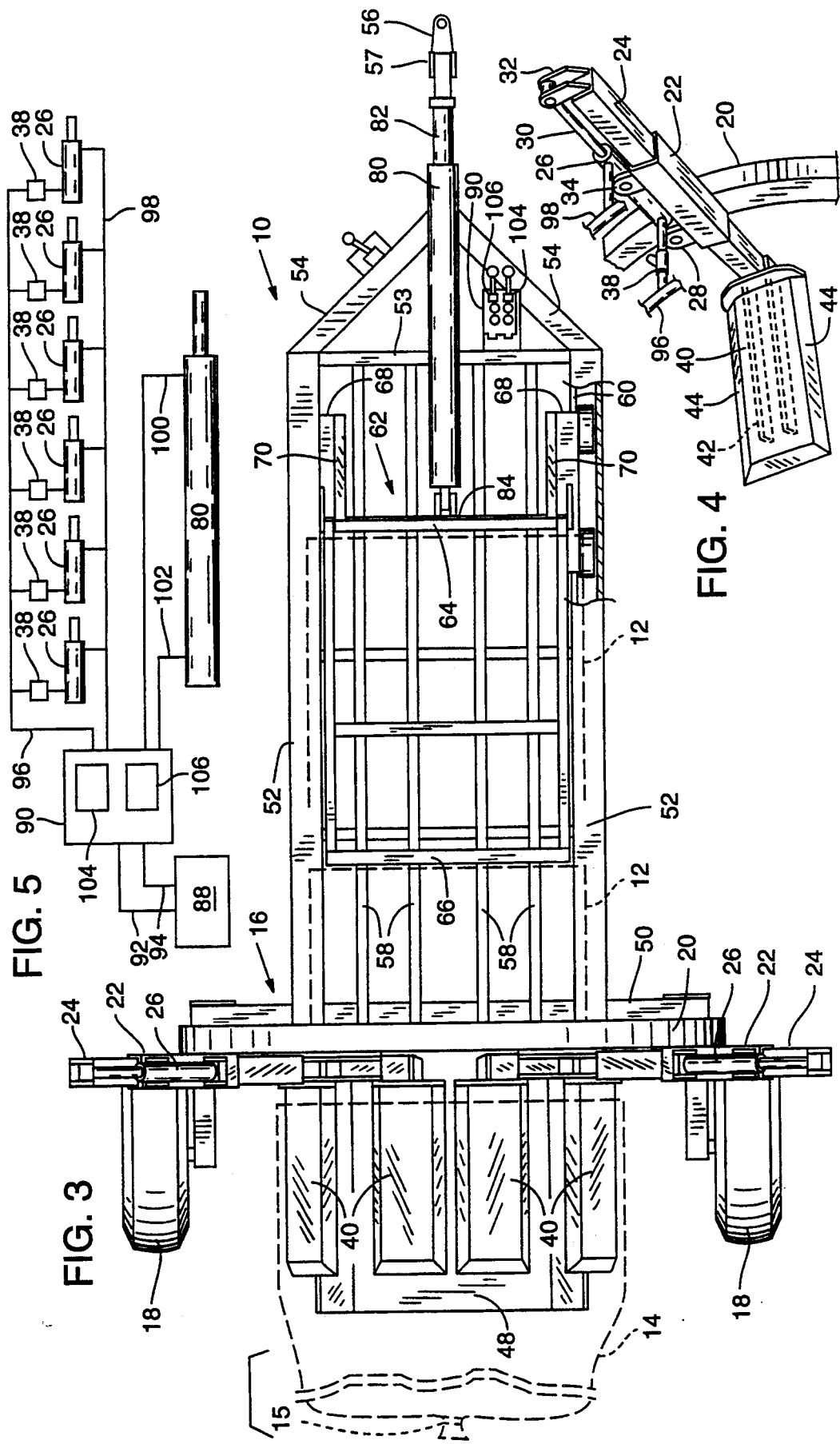

BALE BAGGING MACHINE

FIELD OF THE INVENTION

This invention relates to a bale bagging machine and more particularly to a machine having bag holding fingers that can be selectively configured to accommodate different bale configurations.

BACKGROUND OF THE INVENTION

The concept of inserting large hay bales into plastic bags is disclosed in U.S. Pat. No. 4,606,176. Large bales weighing many hundreds of pounds, e.g., 2,000 lbs., are laid end to end and the bagging machine carrying a folded plastic bag is driven over the bales and in the process, the bales are deposited in the bag. An improvement to the above machine is disclosed in U.S. Pat. No. 5,220,722. It is desirable that the bag fit snugly to the bales. This latter invention provides an elastic bag which is stretched open by expandable fingers. The bales are directed through the bag opening (held open by the fingers) and in the process of being redeposited on the ground, the bag is pulled off the fingers to contract around the bales.

Whereas the concept as generally described is presently being marketed, it has been found that the bag filling process is not without some problems. The fingers which are cylindrical bars are provided at about six positions around a circle. With the bag stretched around the fingers, the bag opening assumes the shape of a polygon. The bale has a curved cross section and unless enough tolerance is provided, the bale can occasionally snag and tear the bag.

Also, whereas the bales as contemplated for bagging by prior bagging machines are considered to be round in shape (having, e..g, a 4 foot to 6 foot diameter), the expandable fingers of the prior machines are arranged on the periphery of a circle which is considered optimal for receiving the round bales. (Here it will be explained that the fingers move in and out and to fit different sizes of bales but regardless of the desired size established, the fingers are essentially located on the periphery of a circle.) The problem is that the bales are not necessarily and most likely are not truly round. The longer a bale lies in the ground, the more misshapen it becomes simply due to the weight of the bale. The bale settles and spreads and it becomes shorter and wider with a flat bottom and a flattened but curved top. It is an irregular shape and the more severe cases can be a problem for bag filling machines.

BRIEF SUMMARY OF THE INVENTION

The present invention at least in part is directed to a modification of the bag holding/expandable fingers to resolve the problems described. As in prior devices, the preferred embodiment of the present invention includes an oversized ring support and a mover mechanism that moves bales through the ring. The cylindrical rods referred to as expandable fingers in the prior devices are replaced with curved fins referred to as paddles, i.e., they are narrow in thickness but they are much wider than the prior fingers so as to provide more surface area for supporting a bag.

The cylinders that move the fins radially are controlled by a valve arrangement that allows simultaneous or selective radial movement of the fins. The configuration of the opening defined by the fins can therefore be varied to accommodate different shapes of bales. Furthermore, it may be desirable to reshape the bale so as to conform a particularly misshapen bale to the shape of other bales being bagged. Certain of the cylinders can be isolated by the valve arrangement to produce sufficient hydraulic pressure to force a rounding of the bale.

Other features include a bale mover that pushes the bales into the bag, i.e., the bales are individually loaded on a platform in front of the bag and then pushed into the bag. The machine can be designed for receiving square or rectangular configured bales as well. These and other features of the invention will be appreciated upon reference to the detailed description and drawings referred to therein.

DESCRIPTION OF THE DRAWINGS

FIG. 1 is a side view of a bale bagging machine in accordance with the present invention;

FIG. 3 is a top plan view as taken on view lines 3—3 of FIG.

FIG. 4 is a perspective view illustrating an expandable paddle as used on the bagging machine of FIG. 1; and FIG. 5 is a diagram of the hydraulic circuitry used in the operation of bale bagging machine of FIG. 1.

DESCRIPTION OF THE PREFERRED EMBODIMENT

Figure 1A:
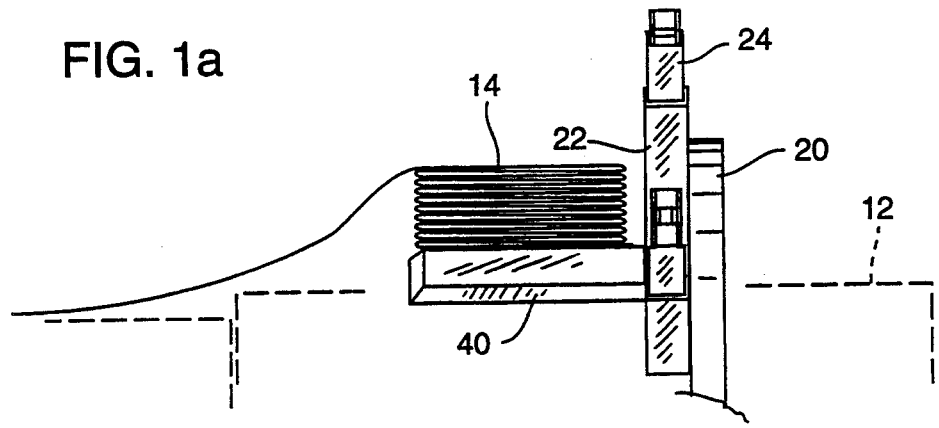
FIG. 1A is an enlarged partial view illustrating a bag mounted on the fingers of the device of FIG. 1.
Figure 2:
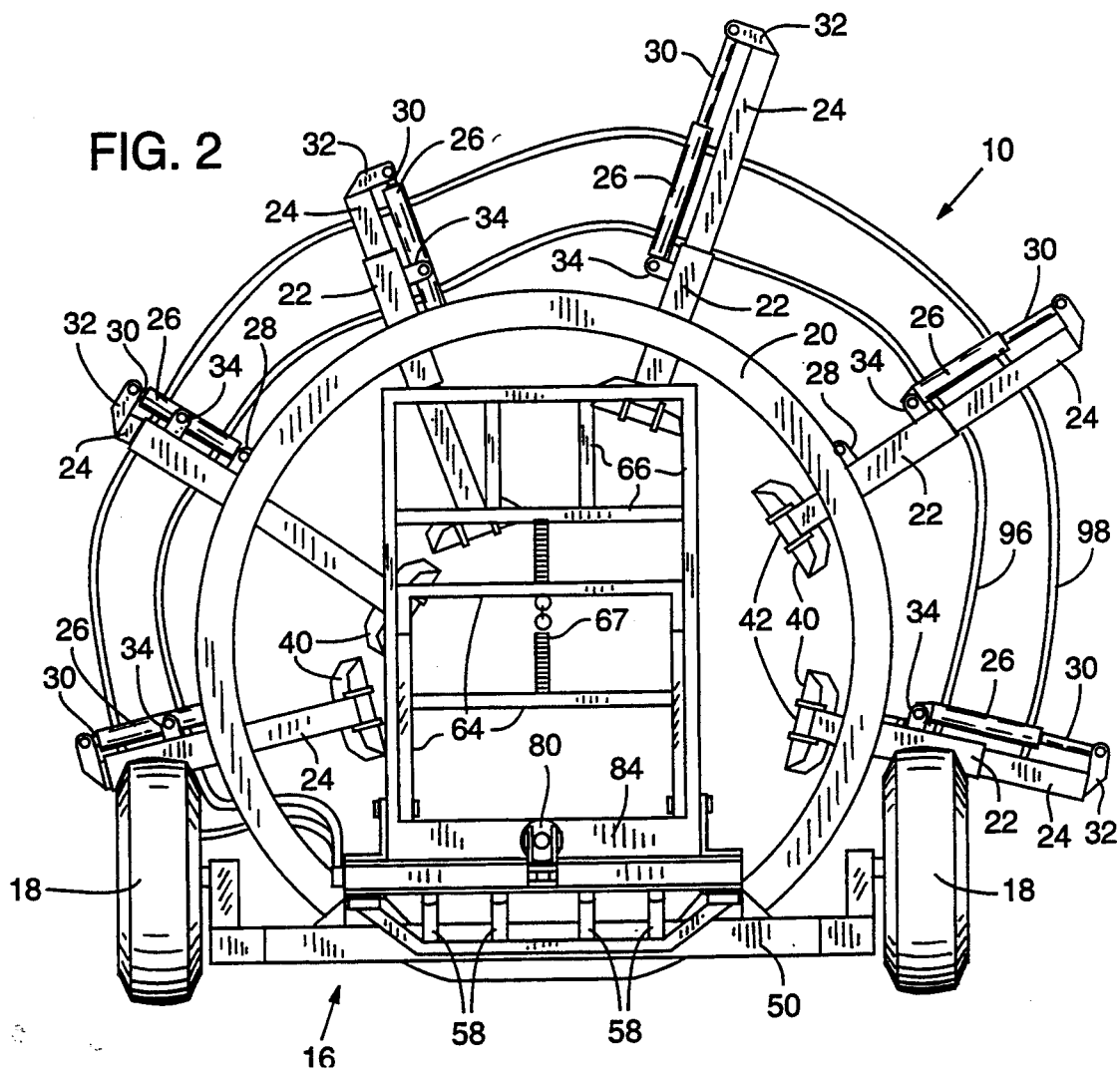
FIG. 2 is an end view as taken on view lines 2—2 of FIG. 1.

Refer now to FIGS. 1, 2 and 3 of the drawings which illustrate a bale bagging machine 10 of the present invention. The machine 10, as will later be explained, is arranged to insert multiple bales 12 into an elongate elastic sheath, such as a bag 14. The machine 10 has a chassis 16 for supporting the components and has wheels 18 to facilitate transporting the machine 10. A supporting member 20, which in this embodiment is circular and defines an opening through which the bales 12 will be fed, is fixedly attached to the chassis 16 as by welding. Sleeves 22 are strategically fixedly mounted to the support member 20 as by welding and are configured to receive support arms 24. The sleeves 22 in this embodiment are elongate rectangular members having a rectangular opening sized to slidably receive rectangular support arms 24. The support arms 24 are slidably movable in the sleeves 22 by cylinders 26.

As seen in FIG. 2, the cylinders 26 are mountable to a bracket 28 or a bracket 34 extending from the sleeve 22 and an end of the cylinder rod 30 of the cylinder 26 is mounted to a bracket 32 extending from the outer end of the support arm 24. Brackets 28, 34 are sufficiently wide to permit the entry of the body of the cylinder 26. Brackets 28, 34 provide alternative mounting points for the cylinder 26 which is utilized to adapt the machine to a different size of bag 14 and thus a different size of bale 12. The support arms 24 are movable radially inward and outward with respect to the support member 20 by operation of the cylinders 26. The cylinders 26 are arranged to be movable in unison or independently. Valves 38 (shown in FIGS. 4 and 5) are provided for each of the cylinders 26 to isolate the cylinder from the hydraulic circuit. Fingers (paddle shaped fins, hereafter sometimes referred to as paddles) 40 are mounted on the end of the support arms 24 with the paddles 40 extending in a near normal attitude to the support arms 24.

As shown in FIGS. 1 and 3, the paddles 40 extend rearwardly from the support member 20. The paddles 40 as best seen in FIG. 4 are preferably formed with a slight curvature and have beveled edges 44 formed along the extended end and the sides of the paddle. Support ribs 42 extending from the support arm 24 and attached to the underside of the paddle 40 are provided for additional strength and rigidity. The paddles 40 fixedly mounted to the support arms 24 are thus movable radially inward and outward with respect to the support member 20 by the operation of the cylinders 26.

A bottom support plate 48 is fixedly mounted to a cross member 50 of the chassis 16 strategic to the mounting of the support member 20 to the chassis 16. The bottom support plate 48 extends rearwardly substantially the same distance as the paddles 40 extend from the support member 20. The paddles 40 in combination with the support plate 48 define a bale receiving opening. The paddles 40 moved radially inward in effect contract the bale receiving opening and the paddles 40 moved radially outward enlarge the bale receiving opening.

The chassis 16 forward of the support member 20, that is on the side opposite of the mounting of the support plate 48 and the paddles 40, is arranged to receive a bale 12 to be sheathed. The chassis 16 has side frame members 52 extending forward of the cross member 50 substantially parallel to each other and in a space relation. The side frame members 52 are basically U-type channels that have the openings 60 of the U facing each other. Frame members 54 extend from the side frame members 52 to a center hitch member 56. A cross frame member 53 extends between the side frame members 52 at the juncture of the side frame members 52 with frame members 54. Center supports 58 are provided between the side frame members 52. One end of each of the center supports 58 is fixedly joined to the support plate 48 and the opposite ends are joined to the cross frame member 53. The side frame members 52 and the center supports 58 in combination form a cradle (platform) for receiving a bale 12 to be sheathed.

A bale pusher 62 is provided on the chassis 16 strategic to the defined cradle. The pusher 62 has an upright lower rectangular frame 64 and an upper rectangular frame 66. The lower end of the frame 64 is fixedly mounted to guide rails 68 slidably mounted in the side frame members 52. The side openings 60 (see FIG. 3) of the frame members 52 facilitate the slidable mounting of the guide rails 68 in the frame members 52. Bracing members 70 attached to frame 64 at 72 and to the guide rails 68 at 74 are provided for added strength and rigidity. The upper frame 66 is hinged to the lower frame 64 and may be pivoted downward as shown in FIG. 1 to extend toward the support member 20 substantially normal to the lower frame 64 and is maintained in position by a spring and chain 67. The upper frame 66 is hinged to pivot toward the support member 20 and in effect extends the reach of the pusher 62. The pusher 62 is slidably movable by a cylinder 80. An end of the cylinder 80 is pivotally attached to a cross member 84 of the lower frame 64. The cylinder rod 82 of the cylinder 80 is pivotally attached to the hitch member 56 on a bracket 57. The pusher 62 is slidably movable toward and away from the support member 20 by extension and retraction of the cylinder rod 82 of the cylinder 80.

FIG. 2 illustrates the arrangement of the paddles 40 in relation to the support member 20 and the alternative mounting arrangements of the cylinders 26 on the sleeves 22. The left side of the machine (as viewed in the figures) has the cylinders mounted on the sleeves 22 in brackets 28. This is the arrangement for the small diameter bales 12 and thus the small diameter bag 14 suited for sheathing the small diameter bales 12. The cylinders 26 when mounted on brackets 28 will position the arms 24 and thus the paddles 40 closer to the center of the support member 20. The paddles 40 are moved radially inward by operation of the cylinders 26 to facilitate placing a bag 14 on the paddles 40 and the lower support plate 48. The bag 14 is folded in a serpentine manner whereby the successive folds are laid over the underlying folds as illustrated in FIG. 1a. The prior gathered arrangement is illustrated in U.S. Pat. No. 4,606,176. The folded arrangement allows the overlying folds to more easily slide off the fingers and avoids the direct rubbing of the bag material on the fingers. Whereas previously the fingers were highly polished steel to minimize this wearing, the cost thereof is eliminated with the folded arrangement of FIG. 1A. The folded bag is then placed on the paddles 40 and the support plate 48 with the bag 14 encircling the paddles 40 and the support plate 48 as shown in FIGS. 1 and 3. The paddles 40 are moved radially outward by operation of the cylinders 26 to expand the defined bale receiving opening of the machine 10 and to stretch the opening of the bag 14. The large surface area of the paddles 40 in contact with the inner surface of the bag 14 provides for a more uniform stretching of the bag 14. The bag 14 is preferably of a resilient plastic material that will assume its original dimensions when the stretching forces are removed.

Refer now to FIGS. 1 and 3 of the drawings which illustrates the machine 10 with a bag 14 fitted to the paddles 40 and the support plate 48. The machine 10 is shown in the process of inserting bales 12 into the bag 14. Initially a sufficient portion of the bag 14 is pulled off the paddles to facilitate gathering and tying or otherwise fastening the bag end to define a closed end 15 of the bag 14. The paddles 40 are then extended radially outward by operation of the cylinders 26 to expand the defined bale receiving opening of the machine 10 and to stretch (expand) the opening of the bag 14. A bale to be sheathed is placed on the platform (cradle) of the machine 10. The pusher 62, by operation of the cylinder 80, forces the bale 12 through the opening of the support member 20 into the bale receiving opening defined by the position of the paddles 40 in combination with the lower support plate 48. The bale 12, as it is forced into and through the opening will be received within the bag 14 and as it continues through the opening will come into contact with the tied end 15 of the bag 14 and will pull a portion of the bag 14 off the paddles 40 and the lower plate 48. Another bale is placed on the platform and it is forced into the opening and into abutment with the first bale by operation of the pusher 62. The second bale 12 as it continues to move into the opening will force the first bale 12 to exit the machine 10 to be deposited on the ground. The first bale 12 is now encased in the bag 14 and the bag 14 will contract to its original dimension to conform closely to the size and shape of the bale 12. The first bale deposited on the ground within the bag 14 acts as an anchor. As the second and succeeding bales 12 are forced through the machine 10 and into the bag 14, the machine 10 will be urged to move forward by the pusher 62 applying a force onto the bales 12. The towing unit to which the machine 10 is hitched is utilized to provide the necessary braking force if required.

The process continues until all of the bales 12 have been sheathed in the bag 14 or the capacity of the bag 14 has been reached. When the last bale 12 to be inserted into the bag has been forced into the entry of the opening, the pusher 62 is retracted and the upper frame 66 of the pusher 62 is tilted forward. The upper frame 66 being tilted downward provides the pusher 62 with sufficient reach to force the last bale through the machine to be deposited on the ground when the pusher 62 is again advanced. The end of the bag 14 adjacent the last bale is then tied off which will provide an air tight enclosure for the bales 12.

Refer now to FIG. 5 of the drawings which illustrates in block diagram the hydraulic circuit of the machine 10. A power source, such as a hydraulic pump, is provided to supply the motive power to move the motors (cylinders) of the machine 10. Tractors are most often utilized as the towing unit and most tractors of today have their own hydraulic pumps, reservoirs and controls valves. In this embodiment, control valves are provided on the machine 10 to control the operation of the cylinders.

As shown in the diagram of FIG. 5, a pump and reservoir unit 88 is connected to a valve body 90 by hydraulic lines 92 and 94. The valve body 90 has two control valves; control valve 104 for controlling the operation of the cylinders (motors) 26 and control valve 106 for controlling the operation of the cylinder (motor) 80. Recall that the cylinders 26 move the paddles radially inward and outward with respect to the supporting member 20 and cylinder 80 moves the pusher 62 toward and away from the supporting member 20. Hydraulic line 96 connects the control valve 104 to the cylinders 26 via the shut off valves 38. When valve 104 is operated to supply positive hydraulic pressure and flow to line 96, the cylinders 26 (with the valves 38 opened) will be operated to move the paddles 40 radially outward. Line 98 serves as a return line for the hydraulic fluid. Any one or multiple cylinders 26 may be made selectively inoperative by closing a valve 38 associated with the cylinder 26. When the valve 104 is operated to supply positive hydraulic pressure and flow to line 98, the cylinders will be operated to move the paddles 40 radially inward. Hydraulic line 96 now serves as a return line. Once again any one of the cylinders 26 or multiple cylinders may be made selectively inoperative by closing an appropriate valve 38. Valve 106 controls the operation of the cylinder 80. When valve 106 is operated to supply positive hydraulic pressure and flow to line 100, the cylinder rod 82 of the cylinder will be retracted and thus the pusher 62 will be moved away from the supporting member 20. When valve 106 is operated to supply positive hydraulic pressure and flow to line 102, the cylinder rod 82 will be extended to move the pusher 62 toward the supporting member 20.

The cylinders 26 may be selectively mounted on either brackets 28 or 34 on the sleeve 22. This affords altering the opening of the bag 14 in the stretched condition and is beneficial for inserting misshapen bales 12 into the bag 14. Bales tend to settle and become misshapen after baling, particularly if the bales are loosely compacted during baling and the bales sit for a period of time prior to the bagging operation. The bales tend to assume a somewhat elliptical shape with a portion of the bale in contact with the ground becoming flattened. A user may for example mount the cylinders 26 controlling the lower paddles in the brackets 34 and have the balance of the cylinders mounted in brackets 28. This will allow the stretching of the bag into a shape somewhat like the misshapen bale, that is the lower paddles as they are moved radially outward will in combination with the balance of the paddles stretch the bag 14 into a shape somewhat like the misshapen bale.

Figure 2A:
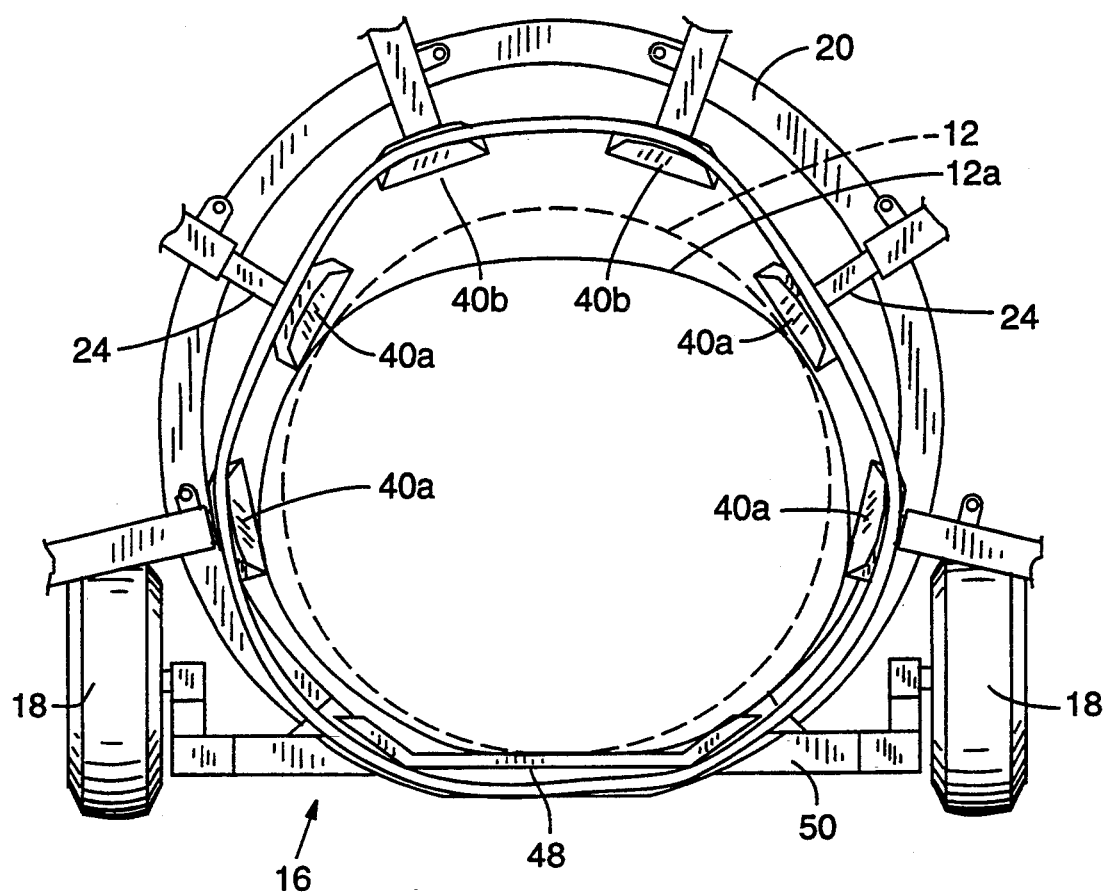
FIG. 2A is a schematic illustration illustrating the fingers/paddles being used to reshape a bale.

The paddles may also be utilized to reshape a bale so that it may be more readily inserted into the bag. This is schematically illustrated in FIG. 2A, e.g., compare the misshapen bale 12a with the more common circular bale 12 in dash lines. Considering the example of the illustrated misshapen bale 12a, the paddles 40a are moved radially outward and the pusher 62 forces the bale into a position where the paddles 40a are forced up against each side of the bale. The upper paddles 40b may be isolated from motion by closing the valves 38 associated with each corresponding cylinder 26 of paddles 40b. The lower paddles 40a are then moved inward to force the bale into a shape suitable for insertion into the bag 14. Other combinations are possible by simply altering the mounting of the appropriate cylinders 26 and isolating the appropriate cylinders 26 by the valves 38.

Those skilled in the art will recognize that modifications and variations may be made without departing from the true spirit and scope of the invention. The invention is therefore not to be limited to the embodiments described and illustrated but is to be determined by the appended claims.

What is claimed is:

1. A bale bagging machine comprising:
    a movable chassis;
    a configured support member mounted on the chassis, said support member defining a circumference surrounding an opening and a center axis through the opening;
    arms movably mounted in spaced relation on the support member and surrounding said opening, said arms movable radially inward and outward relative to said center axis,
    motors connected to the arms for moving the arms radially inward and outward;
    fingers mounted on the arms, said fingers extending axially from said support member, said fingers defining a bale receiving opening having a circumference, said fingers radially movable with said arms for enlarging and contracting the bale receiving opening, said fingers adapted to receive an elastic bag surrounding the fingers and defining an open end of the bag through which bales are to be inserted; and
    a control selectively and independently controlling the motors whereby the open end of the bag can be configured to a bale shape and the fingers can be selectively and independently operated to reshape the bale as desired.

2. A bale bagging machine as defined in claim 1 wherein:
    said fingers are configured relative to the bale receiving opening defined by said fingers to have a thickness in the radial direction, a length in the axial direction and a width in the circumferential direction, said width substantially greater than said thickness and the combination of fingers collectively providing a curved surface area for circumferential support of the opened bag.

3. A bale bagging machine as defined in claim 1 wherein:

a platform for receiving bales is provided on the chassis, a bale pusher member slidably mounted on the chassis and the bale pusher member being slidably controlled for pushing bales from the platform into the bale receiving opening.

4. A bale bagging machine as defined in claim 3 wherein:

the bale pushing member is substantially the height of the bales to be inserted into the bale receiving opening, said bale pushing member having an upper section that is foldable into a lower position for extending the reach of the bale pusher member to enable pushing of a last bale into and through the bale receiving opening.

5. A bale bagging machine as defined in claim 1, wherein:

multiple motor mounting brackets are mounted on said support member for each of said motors;

each of said motors selectively mounted in one of said brackets for adjusting the bale receiving opening to a particular sized bale and a corresponding sized bag.

6. A bale bagging machine as defined in claim 5, wherein:

a support plate is mounted on the support member, said support plate extending axially from said support member, said support plate and said fingers cooperatively define said bale receiving opening.

7. A bale bagging system comprising:

a configured support member mounted on the chassis, said support member defining a circumference surrounding an opening and a center axis through the opening;

arms movably mounted in spaced relation on the support member and surrounding said opening, said arms movable radially inward and outward relative to said center axis, motors connected to the arms for moving the arms radially inward and outward;

fingers mounted on the arms, said fingers extending axially from said support member, said fingers defining a bale receiving opening having a circumference, said fingers radially movable with said arms for enlarging and contracting the bale receiving opening, said fingers adapted to receive an elastic bag surrounding the fingers and defining an open end of the bag through which bales are to be inserted; a control selectively and independently controlling the motors whereby the open end of the bag can be configured to a bale shape and the fingers can be selectively and independently operated to reshape the bale as desired; and an elastic folded bag mounted on the fingers, said bag folded in a serpentine arrangement whereby the inner most fold contacts the fingers and overlying folds lie directly on the underlying folds.

8. A bale bagging machine comprising:

a movable chassis;

a configured support member mounted on the chassis, said support member defining a circumference surrounding an opening and a center axis through the opening;

a bottom support plate for supporting bales to be bagged projected through said opening;

arms movably mounted in spaced relation on the support member above said bottom support plate and surrounding said opening, said arms movable radially inward and outward relative to said center axis, motors connected to the arms for moving the arms radially inward and outward;

fingers mounted on the arms, said fingers extending axially from said support member, said fingers in combination with said bottom support plate defining a bale receiving opening having a circumference, said fingers radially movable with said arms for enlarging and contracting the bale receiving opening, said fingers adapted to receive an elastic bag surrounding the fingers and upon radially outward movement, the fingers stretch the bag defining an open end through which the bales are to be inserted; and said fingers being configured relative to the bale receiving opening defined by said fingers to have a thickness in the radial direction, a length in the axial direction and a width in the circumferential direction, said width substantially greater than said thickness and defining a convex support surface normal to the radial movement of said fingers to provide a broad surface area supporting the bag at the areas of stretching by the fingers, and the combination of fingers when radially stretching the elastic bag collectively defining continuously a curved surface area above said bottom support plate for circumferential support of the opened bag.

9. A bale bagging machine as defined in claim 8 wherein:

a platform for receiving bales is provided on the chassis, a bale pusher member slidably mounted on the chassis and the bale pusher member being slidably controlled for pushing bales from the platform into the bale receiving opening.

10. A bale bagging machine as defined in claim 9, wherein:

multiple motor mounting brackets are mounted on said support member for each of said motors;

each of said motors selectively mounted in one of said brackets for adjusting the bale receiving opening to a particular sized bale and a corresponding sized bag.

11. A bale bagging machine as defined in claim 8 including a folded bag mounted on the fingers, said bag folded in a serpentine arrangement whereby the inner most fold contacts the fingers and overlying folds lie directly on the underlying folds.

* * * * *